United States Patent [19]

Downs et al.

[11] 3,718,536

[45] Feb. 27, 1973

[54] COMPOSITE BOARD AND METHOD OF MANUFACTURE

[75] Inventors: Martin L. Downs, Appleton; Milton G. Schmitt, Kankauna, both of Wis.

[73] Assignee: Thilmany Pulp & Paper Company, Kaukauna, Wis.

[22] Filed: April 22, 1970

[21] Appl. No.: 31,023

[52] U.S. Cl. ............... 161/168, 156/62.2, 156/311, 156/312, 161/162, 161/170, 161/413, 162/225, 264/134, 264/257, 264/319
[51] Int. Cl. ..... B32b 5/16, B32b 19/02, B32b 29/00, B32b 31/20
[58] Field of Search......161/168, 170, 250, 270, 162, 161/413; 156/62.2, 311, 312, 295; 162/164, 168, 169, 176, 189, 224, 225, 202–206; 264/125, 134, 319, 331, 109, 121, 122, 128, 257, 123; 106/163

[56] References Cited

UNITED STATES PATENTS

| 3,367,828 | 2/1968  | Carter et al. | 162/225  |
| 1,862,688 | 6/1932  | Loetscher     | 264/319  |
| 3,511,750 | 5/1970  | Hider         | 161/168  |
| 3,032,820 | 5/1962  | Johnson       | 264/331  |
| 2,181,556 | 11/1939 | Wells         | 162/176  |
| 2,619,681 | 12/1952 | Baker et al.  | 264/319  |
| 3,011,938 | 12/1961 | Chapman       | 156/62.2 |
| 3,021,244 | 2/1962  | Meiler        | 156/62.2 |

*Primary Examiner*—William A. Powell
*Attorney*—Fitch, Even, Tabin & Luedeka

[57] ABSTRACT

A composite board formed from a mass of shredded paper containing thermoplastic material.

11 Claims, No Drawings

3,718,536

COMPOSITE BOARD AND METHOD OF MANUFACTURE

This invention relates generally to a composite board, and more particularly it relates to a composite board manufactured from shredded paper having associated therewith a thermoplastic material, and to a method of manufacturing such composite board.

There are presently available a wide variety of composite board materials. Composite boards, also referred to as hard board, chip board, particle board, panel board, acoustical board, and the like, are used for various purposes, such as structural members, decorative articles, insulation, and acoustical tile and walls, depending upon the density and puncture resistance of the composite board. To a large extent, the density and puncture resistance of composite board is a function of the conditions under which the composite board is manufactured, and the raw materials used to form the composite board.

Known processes for the manufacture of composite board include wet processes, as in the manufacture of hard board, and dry process, as in the manufacture of particle board. Generally, hard board is manufactured on papermaking machinery, for example, a cylinder machine, from a wet slurry of wood chips or fiber raw materials, and the principal bonding agent is the naturally occurring lignin. Typically, pressures of from 400 to 500 psig and temperatures up to 350°F. are encountered in the wet process for the manufacture of hard board.

In the dry process, a mixture of wood chips or wood particles are tumbled with a thermosetting resin binder such as urea formaldehyde or melamine formaldehyde or other binder such as are utilized in plywood manufacture, are air laid or air formed into a web in essentially dry condition. The web is then pressed at temperatures up to 500°F. and pressures up to 1000 psig to compress the web into an integral unitary structure.

In recent years a large proportion of the paper products which heretofore were coated with wax, for example, wrapping papers, milk cartons, and the like, have been coated with a thermoplastic coating, principally polyethylene. Polyethylene coated aluminum foil and other types of foil are also becoming increasingly important in various laminations, wrapping papers and the like, where the foil is utilized for decorative purposes.

As used herein the term "thermoplastic material" means polymerized resins which are thermoplastic in nature, i.e., become softened and flowable upon heating above their thermal softening point without decomposition. Thermoplastics are a well known class of materials and include polymerized olefins, e.g., polyethylene, polypropylene and polybutylene; polymerized vinyls, e.g., polyvinylchloride, polyvinylacetate and various vinyl copolymers. The major thermoplastic material used in coating paper and foil is polyethylene, and the description herein is principally directed to polyethylene coated paper. However, it is to be understood that thermoplastic materials other than polyethylene are contemplated.

In the manufacture of polyethylene coated paper and foil there is a large amount of coated waste and scrap paper produced in the punching of blanks, and in the slitting and cutting of the paper into desired sizes and shapes. Heretofore disposal of the polyethylene coated paper has been a problem. The coated paper is difficult to burn, leading to pollution problems, and it is also difficult to economically separate and reclaim the paper from the polyethylene. Reclaimed paper could only be repulped for incorporation into the lower grade papers due to degradation of the cellulose fibers in the recovery process.

It is an object of the present invention to provide a composite board and a method of manufacturing such board. It is a further object to provide a composite board manufactured from shredded paper containing a thermoplastic material, and a method of manufacturing such board. It is an additional object to provide a composite board manufactured from thermoplastic coated shredded waste paper.

These and other objects of the invention will become apparent from the following detailed description.

Very generally, the present invention is directed to a composite board formed by compressing a mass of shredded paper containing thermoplastic material under heat and pressure in order to cause the individual shreds of paper to become bonded together by means of the thermoplastic material to form a unitary rigid composite board.

The manufacture of the composite board from shredded paper which has a thermoplastic material associated therewith provides a unique physical structure. The composite board product is made up of individual pieces, i.e., sheets or shreds of paper arranged in an overlying and overlapping configuration. The heat and pressure applied to the mass during forming, causes the paper shreds to assume a generally laminar configuration made up of a plurality of layers of paper on top of one another within the board. Thus, cross-sections through the composite board reveals lamination of paper plys bonded together by the thermoplastic material associated with the paper. The paper shreds are randomly oriented, providing uniform strength in all directions in the board. The composite board is made up of a plurality of two dimensional pieces of paper, i.e., having length and width but essentially no thickness, and accordingly provide a composite board structure that is different than composite board heretofore manufactured from fibrous materials by either a wet process or a dry process.

The terms "shredded paper" and "paper shreds" as used herein mean random paper pieces, sheets, ribbons, punchings and the like. As indicated, the disclosed composite board is advantageously manufactured from waste and trim thermoplastic coated paper. Typically, waste and trim thermoplastic coated paper recovered in a vacuum suction system from coated paper manufacturing operations is in the form of ribbons of up to 2 inches in width and 8 inches in length. It is contemplated that the shredded paper raw materials may include larger sheets of paper containing thermoplastic material, for example, sheets of paper which may be lettersize or the like, or may be of a size which is substantially the same length and width as the composite board product. However, because of the existence of the large amounts of waste paper containing thermoplastic materials is contemplated that the major portion of the paper raw materials will be shredded waste paper. It is specifically contemplated that larger unitary sheets of paper with or without a thermoplastic material will be utilized as facing sheets for the composite boards. In some instances, it is contemplated that it would be possible to form a composite board consisting entirely of thermoplastic containing sheets of paper which are of the final dimension of the composite board. In this instance the composite board would be a lamination of multiple plys of thermoplastic containing paper stacked on top of each other.

The paper shreds are made up of a paper ply and a thermoplastic material which may be in the form of an impregnate or in the form of a coating. Generally, the paper shreds will be waste and trim obtained in usual papermaking operations in the manufacture of polyethylene extrusion coated paper. The paper ply, i.e., the paper base to which the thermoplastic coating material is applied may be any one of usual paper materials, and does not appear critical. It has been found that the paper ply may have a basis weight of between about 10 and about 200 pounds (3,000 square feet). Thus the paper ply may be a lightweight paper, such as tissue paper, or may be a heavy paper, such as paper board.

The term "paper ply" as used herein is also intended to include aluminum or other metallic foil which has associated therewith a thermoplastic material. In many instances waste paper contains a lamination of paper and foil in addition to a polyethylene coating and it is intended that the paper shreds may be a lamination of paper and foil, or, as indicated, may comprise only thermoplastic coated foil. In addition, the paper shreds may contain usual additives such as wet strength agents, ink and pigments, and minor portions of thermosetting resins, for example, urea formaldehyde and/or melamine formaldehyde resins. It is contemplated that up to about 10 percent by weight of the final composite board may comprise thermosetting resins.

Each of the individual shreds desirably has associated therewith a thermoplastic material of the type set forth herein. The thermoplastic material may have a wide range of physical characteristics and yet provide a desirable composite board. The thermoplastic material should have a thermal softening point below the temperature at which the paper ply starts to degrade or char, normally below about 360°F. In addition to softening at temperatures below the charring point of the paper ply, the thermoplastic material must be able to flow and bond together the individual pieces of shredded paper, and fill any voids therebetween. The flowability of a thermoplastic material can be assessed by its melt index (ASTM D1238-65T) and it has been found that polyethylene having a melt index of between 3 and 18 grams per 10 minutes at 190°C. have desired thermal softening and flowability. Such polyethylene may be of low, medium or high density, e.g., 0.90 to 0.96 as measured by ASTM D1505-63T. Similarly, propylene and copolymers having a density between 0.90 and 0.96 and a melt index of between 5 and 15 grams per 10 minutes at 230°C. have been found to be acceptable. Other thermoplastics having equivalent melt indexes are also contemplated.

The thermoplastic material may include any of the usual pigments, dyes, inks, fillers, and the like normally associated therewith.

It is believed, although the invention is not limited thereto, that the particularly advantageous results that are provided by the disclosed composite board and method of manufacture result from the use of shredded paper containing thermoplastic material as the principal raw material for the board. In this fashion the thermoplastic material, which causes bonding of the paper shreds upon application of heat and pressure, is substantially uniformly distributed throughout the board. This results in uniform bonding and uniform strength throughout the board, and substantially eliminates areas of weakness due to lack of bonding which might result if the thermoplastic material were not associated with the shredded paper and was separately added.

The composite board desirably contains at least about 90 percent by weight of paper shreds containing thermoplastic material, and at least about 25 percent by weight of the finished board should be thermoplastic material. Preferably the finished board contains between about 35 and about 45 percent by weight thermoplastic material, and at least about 90 percent paper shreds containing thermoplastic material.

The remainder of the composite board may include up to 10 percent by weight of paper shreds that do not have any thermoplastic material associated therewith, glass fibers, other fillers, flameproofing agents and the like. It is generally preferable that when the raw materials include paper shreds that do not contain thermoplastic material, the thermoplastic content of the composite board product should exceed 35 percent by weight it having been found that at above this level of thermoplastic material there is sufficient thermoplastic material in the board to provide the desired bond strength. Of course, when paper shreds that do not contain thermoplastic material are used as raw materials, they should be intimately admixed with the paper shreds containing thermoplastic material in order to provide uniform bonding.

It has been found that the addition of up to 10 percent by weight of glass fibers distributed uniformly throughout the composite board provides increased strength and puncture resistance and it is contemplated to include glass fiber for example, cut glass fiber up to 2½ inches in length, in amounts of from 0 to 10 percent in the shredded paper raw material. It is also possible to add additional amounts of glass fiber, particularly where the thermoplastic content of the paper raw material is relatively high, for example, 40 percent or more, but the additional amounts of fiber glass do not appear to provide proportionate increased puncture resistance. The addition of 10 percent glass fibers increases the puncture resistance (ASTM D-781) of composite board of 0.10 inch caliper as described herein from 500 to 1000 inch ounces per inch.

The invention is also directed to a method for forming a composite board which includes forming a batt of shredded paper containing thermoplastic material, heating the batt to above the softening point of the thermoplastic material, pressing the heated batt with sufficient pressure to cause the thermoplastic material to flow and to consolidate the batt, and cooling the consolidated batt. Preferably, cooling of the consolidated batt to below the softening temperature of the thermoplastic coating material is carried out while maintaining the batt under pressure.

desired, with cooling water circulated through the press to aid in reducing the time required for the pressing step.

It is also contemplated to allow the preform to cool between the pressing operations, for example, if it is desired to store the preform or to ship the preform to another location for the final pressing operation. If the preform is cold, it is necessary to heat the preform to above the thermal softening temperature of the thermoplastic material. The heating of the preform may be carried out with or without pressure and can be effected in a suitable oven prior to introduction of the preform into the press. It is apparent that the first and second pressing steps referred to herein could be carried out in the same press if such is desired.

The consolidated composite board product may have a density between about 40 and about 75 pounds per cubic foot depending upon the degree of heat and pressure applied thereto. Products having a density of above about 50 pounds per cubic foot have been found to be superior for use as pallet construction materials and as automotive boards. These materials at 0.10 inch caliper have a puncture resistance above about 600, as measured by ASTM D–781.

It is also contemplated that the composite board can be drawn while hot in the pressing operation and draw ratios of as high as 25 percent (3 inches of draw for 12 inches of diameter) without serious distortion of the thickness of the board product. It is also apparent that a composite board product can be reheated to above the thermal softening temperature and reformed to a desired shape in the manufacture of specific end use products.

EXAMPLE I

Slitter waste trim from machine finished kraft paper having a basis weight of 50 pounds and coated with 0.91 density polypropylene having a melt index of 10 grams per 10 minutes at 230°C. at a concentration of 10 pounds per ream was used as the raw materials in the manufacture of a composite board. The slitter waste trim had an extra bead of polypropylene amounting to approximately 25 pounds of polypropylene for 50 pounds of paper providing a raw material containing 33½ percent polypropylene. The slitter waste trim was chopped to approximately ⅝ width and mixed lengths of 3 to 6 inches and was airlayed in a forming box at about 2.6 pounds per square foot in the form of a loose batt. The batt was protected on either side by metal caul plates, and was pressed for 5 minutes at 150 psig in a press the platens of which were heated to 330°F. by means of saturated steam at a pressure of 130 pounds gauge. The resulting preform was removed from the press and while still hot was inserted in a second press and pressed for 3 minutes at 100 psig during which time the platens of the press were cooled with cooling water at 60°F. At the end of the 3 minute pressing time the batt was one half inch in thickness and weighed 2.6 pounds per square foot and had a density of about 62 pounds per cubic foot. The consolidated composite board had a puncture strength too high to measure by ASTM D–781 in this thickness. When special 0.10 thickness test pieces were made they checked at 500 inch ounces per inch by D–781.

EXAMPLE II

Slitter trim from 30 pounds basis weight bleach kraft paper having a coating on each side of low density polyethylene having a 0.92 density and a melt index of 7 grams for 10 minutes at 190°C. was used as a raw material. A bead of resin at the edge of the sheet increased the basis weight of the polyethylene to approximately 10 pounds per ream on each side of the paper providing a raw material having a 50 pound basis weight in which 40 percent was polyethylene. This slitter trim was of sufficient light weight and has a sufficiently high concentration of polyethylene that it was not necessary to rechop the slitter trim and it was utilized as obtained from the slitter operation in the manufacture of a composite board. The slitter trim had random lengths of from 6 to 18 inches and was formed into a batt substantially as described in Example I. It was only necessary to press the batt for 4 minutes at 130 psig and at 330°F. The batt was immediately transferred to a cold press where it was pressed for 2 minutes at 100 psi. The product obtained was a consolidated composite board having a density of approximately 65 pounds per cubic foot and a thickness of approximately 7/16th inch.

EXAMPLE III

A composite board was prepared in accordance with Example I with the addition of 10 percent by weight of the composite board of chopped glass fibers having a length of about 2½ inches. The composite board had a density of about 64 pounds per cubic foot and had a puncture strength of about 1000 inch ounces on 0.10 inch thickness test process illustrating the increase in strength which is provided by the glass fibers.

EXAMPLE IV 60 pounds basis weight kraft paper having a coating on one side of 15 pounds polyethylene having a density of 0.92 and a melt index of 8.0 was chopped into shreds having a width of about ¼ inch and random lengths of 3 to 6 inches. A batt of this shredded paper was formed having a weight of 2.0 pounds per square foot and was pressed at a temperature of 320°F. and at a pressure of 150 psig for 8 minutes. The pressure was then reduced to 65 and the press was cooled until the temperature dropped below 90°F. at which time the pressure was released and the composite board product was removed from the press.

EXAMPLE V

A conglomerate of various waste papers and aluminum foil ranging in basis weight from 18 pounds to 80 pounds containing thermoplastic coatings having weights of from 4 to 30 pounds and including additional beads of thermoplastic resin common to the edge trim was reslit to ¼ inch width, and air formed into a batt having a weight of 2.5 pounds per square foot. The batt was thereafter pressed at a pressure of 175 psig and at a temperature of 320°F for 10 minutes and was subsequently repressed in a cold press at 100 psig for 8 minutes to provide a composite board product having a density of 70 pounds per cubic foot.

It has been found that when the paper ply of the paper shreds has a basis weight of between about 10 and 40 pounds the batt may be formed from uncut slitter trim of approximately ¾ inch in width and 3 to 8 inches in length. At higher basis weights, the paper shreds are desirably narrower in widths and shorter in length to avoid requiring higher pressures in consolidating the batt.

It is also contemplated that instead of utilizing waste paper such as is generally available in the papermaking industry, and where particular purposes or particular results are desired, for example, flame resistance, a paper web containing particular additives and/or a particular thermoplastic material might be manufactured and then slit or chopped into appropriate lengths and widths for utilization as the shredded paper raw material. In this connection, desirable waterproof characteristics could be imparted to a special paper stock, or a particular resin could be utilized in the formation of the thermoplastic containing paper web. It is in instances of this type where it might be desirable to utilize larger sheets of paper than that which is normally known as "shredded" paper in the manufacture of the composite board.

In the manufacture of the composite board, a mass of the thermoplastic containing shredded paper is formed into a batt of a desired shape and is subjected to heat and pressure sufficient to cause the thermoplastic material to become soft and to cause bonding of the individual paper shreds together. It is contemplated that the composite board may be manufactured continuously by airlaying the shredded paper onto a moving belt or the like, or that the composite board may be manufactured in individual sheets by forming the batt of shredded paper in a form followed by pressing in a ram press. In the continuous manufacture of composite board as described herein, apparatus of the type utilized in the manufacture of particle board can be employed, e.g., dry forming the batt of shredded paper on a travelling belt followed by pressing at elevated temperatures.

It is contemplated that in the manufacture of the composite board, whether utilizing the two-step process incorporating a preform, or in a single-step process, that the top and bottom surfaces of the composite board may include a facing sheet which may contain a printed panelling effect or may be a plastic sheet, and further that caul plates and/or release sheets may be utilized, in accordance with known procedures.

The described process contemplates forming the composite board in its final shape and density in a single pressing operation, which includes heat and pressing and subsequently cooling in a single press. However, to avoid delays inherent in heating and cooling in the same press, it is also contemplated to form a preform of lesser density than is desired in the final product in an initial pressing step followed by a subsequent pressing operation on the hot or reheated preform to consolidate the preform into a final product of desired density, accompanied by cooling of the consolidated product to below the thermal softening temperature of the thermoplastic material.

When the composite board is manufactured in a single pressing step, the batt may be heated to a temperature between about 280°F. and about 350°F., preferably above about 300°F., and pressed at a pressure of between about 200 psig and about 25 psig for between about 4 minutes and about 10 minutes. The temperature, pressure and time are interrelated with temperature and pressure being inversely related for any given length of time. The temperature and pressure required for providing a composite board product of a given density are also dependent upon the melt index of the thermoplastic material, the basis weight of the paper ply, and the amount of thermoplastic material associated with the paper shreds as well as the thickness of board being formed. Selection of the proper conditions to provide the desired result is within the skill of the art.

It has been found desirable to maintain pressure on the composite board during cooling of the board to below the thermal softening temperature of the thermoplastic material. This prevents the phenomenon known as "springback" and provides a uniform even surface on the consolidated board product. Generally, the board should be cooled to below about 170°F. while maintaining a pressure of at least about 65 psig to prevent springback when average weight paper shreds are employed. Generally, and for high density products, the pressure during cooling is as high as practical, e.g., above 150 psig to shorten the press cycle time.

A preform may be manufactured by heating the batt of shredded paper containing thermoplastic material to a temperature above the softening temperature of the thermoplastic material with accompanying pressure sufficient to cause partial bonding of the individual shreds of paper to one another. In this connection, the batt may be heated to a temperature between about 300°F. and about 350°F. and pressed under a ram pressure of between about 60 and about 10 psig for a period of about 3 and about 10 minutes depending on thickness. This amount of heat and pressure is sufficient to provide a preform which when partly cooled to below the thermal softening temperature of the thermoplastic material, generally below about 170°F., is capable of retaining its shape during handling. The preform generally will have a density between about 10 and about 30 pound per cubic foot if allowed to cool when not under pressure.

The pressing of the preform to a final desired shape and density may be carried out on the hot preform from the first press in which case the hot preform from the first press may be directly introduced into a second press for the final pressing before the internal temperature within the preform drops below the thermal softening point of the thermoplastic material. Generally, the internal temperature of the preform should be above about 300°F. if the second press is to be unheated, and in such instances it is contemplated to circulate cooling water through the press to hasten the cooling of the batt during the pressing. If the internal temperature of the preform is below about 280°F., it is usually necessary to heat the preform in the second press to raise the temperature above the thermal softening temperature of the thermoplastic material. The preform may be pressed in the second press at pressures of between about 25 psig and 200 psig for between about 3 and about 8 minutes depending on the desired density of the product. In such instances the second pressing step can be done in a cold press and, if It will be seen that a composite board structure and method of manufacture has been provided which is particularly advantageous in that it is capable of utilizing thermoplastic coated waste paper which has heretofore been difficult to dispose of. The composite board can be formed with high densities and has excellent puncture resistance which makes it advantageous for use as a construction material for example, in the manufacture of skids and pallets. Low density products, suitable for use as acoustical tile or the like, can also be manufactured.

Although certain features of the invention have been set forth with particularity in order to describe the invention, various alternatives within the skill of the art are contemplated.

Various of the features of the present invention are set forth in the following claims.

What is claimed is:

1. A method for the manufacture of composite board which includes providing a raw material source comprising at least about 90 percent by weight of discrete paper shreds having a polymerized thermoplastic plastic material integrally associated therewith,
    a. air forming the paper shreds into a batt,
    b. heating the batt to an elevated temperature above the thermal softening temperature of the plastic material,
    c. consolidating the batt at said elevated temperature under sufficient pressure to cause the paper shreds to become bonded together by the plastic material, and cooling the consolidated batt to below the thermal softening temperature of the plastic material whereby a rigid composite board is provided.

2. A method in accordance with claim 1 wherein the batt is cooled under pressure.

3. A method in accordance with claim 1 wherein the batt is heated to a temperature between about 280°F. and about 350°F. and pressed at a pressure between about 200 psig and about 25 psig for between about 4 and about 10 minutes.

4. A method in accordance with claim 3 wherein the batt is cooled to below about 170°F. while maintaining the pressure on the batt above about 65 psig.

5. A method in accordance with claim 1 wherein the batt is pressed at an elevated temperature above the thermal softening temperature of the thermoplastic material in a first pressing step to consolidate the batt into a preform having a lesser density than the desired composite board, pressing the preform in a second pressing step at an elevated temperature above the thermal softening temperature of the thermoplastic material to consolidate the preform to the desired density, and cooling to below the thermal softening temperature of the thermoplastic material under pressure.

6. A method in accordance with claim 5 wherein the first pressing step is carried out at a temperature between about 280°F. and about 350°F. at a pressure of between about 60 and about 10 psig for a period of between about 3 and about 10 minutes.

7. A method in accordance with claim 6 wherein the preform from the first pressing step is pressed in the second pressing step at a temperature between about 280°F. and about 350°F. at a pressure between about 25 psig and about 200 psig for between about 3 and about 8 minutes.

8. A rigid composite board comprising a compressed and consolidated batt containing at least about 90 percent by weight of discrete paper shreds having a polymerized thermoplastic plastic coating thereon, said batt containing at least about 25 percent by weight thermoplastic material, said paper shreds being bonded together by said plastic to form said batt.

9. A rigid, composite board in accordance with claim 8 in which the paper shreds include a paper ply having a basis weight of between about 10 and about 200 pounds per 3000 square feet, and a coating of a thermoplastic material on said paper ply.

10. A rigid composite board in accordance with claim 9 wherein the paper shreds are waste and trim obtained from the manufacture of thermoplastic coated paper products.

11. A rigid composite board in accordance with claim 10 wherein the thermoplastic material is selected from polyethylene and polypropylene.

* * * * *